US009693412B2

(12) United States Patent
Fu et al.

(10) Patent No.: US 9,693,412 B2
(45) Date of Patent: Jun. 27, 2017

(54) DIMMING DRIVER CIRCUIT AND CONTROL METHOD THEREOF

(71) Applicant: DELTA ELECTRONICS (SHANGHAI) CO., LTD., Shanghai (CN)

(72) Inventors: Xiaoping Fu, Shanghai (CN); Xinghua Zhang, Shanghai (CN); Jian Zhou, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/188,490

(22) Filed: Jun. 21, 2016

(65) Prior Publication Data

US 2017/0150567 A1 May 25, 2017

(30) Foreign Application Priority Data

Nov. 19, 2015 (CN) .......................... 2015 1 0807690

(51) Int. Cl.
*H05B 33/08* (2006.01)

(52) U.S. Cl.
CPC ..... *H05B 33/0851* (2013.01); *H05B 33/0815* (2013.01)

(58) Field of Classification Search
CPC ............ H05B 33/0815; H05B 33/0827; H05B 33/0809; H05B 33/0818; H05B 33/083; H05B 33/0845; H05B 33/0869; H05B 33/08; H05B 33/0857; H05B 33/089; H05B 33/0842; H05B 33/0851; H05B 33/0854

USPC ............ 315/307, 185 R, 291, 122, 186, 308, 315/200 R, 294, 192, 247
See application file for complete search history.

(56) References Cited

U.S. PATENT DOCUMENTS

| 7,256,554 | B2* | 8/2007 | Lys | ...................... F21S 48/325 315/224 |
| 7,313,007 | B2* | 12/2007 | Wu | .......................... G05F 1/70 363/65 |
| 9,101,031 | B2* | 8/2015 | Tanaka | ............... H05B 33/0815 |
| 9,190,900 | B2* | 11/2015 | Carletti | ............... H02M 1/4225 |
| 2005/0231133 | A1* | 10/2005 | Lys | ...................... F21S 48/325 315/291 |
| 2010/0246226 | A1* | 9/2010 | Ku | ...................... H02M 1/4225 363/126 |
| 2011/0148324 | A1* | 6/2011 | Du | ..................... H05B 33/0812 315/297 |

(Continued)

*Primary Examiner* — Douglas W Owens
*Assistant Examiner* — Wei Chan
(74) *Attorney, Agent, or Firm* — Kirton McConkie; Evan R. Witt

(57) ABSTRACT

A dimming driver circuit includes a power converting unit, an input voltage detection unit, an output voltage detection unit, a driving unit and a control unit. The power converting unit receives an input voltage. During an operation of the switch of the power converting unit, the input voltage is converted into an output voltage. The driving unit is used for driving the switch. The control unit calculates an on-time period of the switch in an operation cycle according to a first detecting signal, a second detecting signal and a dimming signal. The control unit generates a control signal to the driving unit according to the on-time period. The driving unit adjusts the operation of the first switch so as to control the brightness of the light-emitting diode.

14 Claims, 12 Drawing Sheets

(56) References Cited

U.S. PATENT DOCUMENTS

2014/0246979 A1* 9/2014 Zhang ................ H05B 33/0815
 315/122

* cited by examiner

DIMMING DRIVER CIRCUIT AND CONTROL METHOD THEREOF

FIELD OF THE INVENTION

The present invention relates to a driver circuit and a control method thereof, and more particularly to a dimming driver circuit and a control method thereof.

BACKGROUND OF THE INVENTION

Nowadays, the dimming driver circuit of the conventional lighting device can be used to adjust the brightness of the lighting device, such as a light emitting diode. A conventional dimming driver circuit comprises a power converting unit, a control unit, a current sensing resistor and a driving unit. Due to that the circuit topologies of the power converting units are different, the conventional dimming driver circuits are classified into two types.

In the first type dimming driver circuit, the power converting unit includes a switch which is connected in series with a positive terminal of the power converting unit. Under this circumstance, a high-side driving unit has to be employed as the driving unit of the dimming driver circuit so as to convert a high voltage into a low voltage required for the switch. In the second type dimming driver circuit, the switch of the power converting unit is electrically connected with the negative terminal of the power converting unit and electrically connected with a reference voltage. Under this circumstance, the current sensing resistor cannot be electrically connected with the reference voltage, and therefore a high-side current detection unit has to be additionally equipped to the dimming driver circuit.

The high-side driving unit and the high-side current detection unit have to be employed in the two types of the dimming driver circuits, respectively. Consequently, the circuitry of the dimming driver circuit is complicated and the fabricating cost is high. In addition, the signal received by the control unit is actually the superposed signal of the error signal and the detecting signal issued from the current sensing resistor. If the dimming signal is lower, the detecting signal issued from the current sensing resistor is lower. Meanwhile, the proportion of the error signal received by the control unit is relatively higher. Consequently, the control unit cannot accurately output the corresponding pulse signal according to the dimming signal, and the output current from the power converting unit cannot be well adjusted according to the dimming signal. The accuracy of dimming by using the conventional dimming driver circuit is unsatisfied because of the current sensing resistor.

Therefore, there is a need of providing dimming driver circuit so as to overcome the drawbacks of the conventional technologies.

SUMMARY OF THE INVENTION

An object of the present invention provides a dimming driver circuit and a control method thereof so as to overcome the drawbacks of high power loss and low efficiency by using the conventional dimming driver circuit, meanwhile to improve the control accuracy of dimming current without output current sensing circuitry.

Another object of the present invention provides a dimming driver circuit and a control method thereof. The dimming driver circuit uses a driving circuit for driving a switch of a power converting circuit. Moreover, an input voltage detection unit and an output voltage detection unit with simplified circuitry and low cost are used for detecting associated parameters of the power converting circuit in order to replace the current detection resistor. According to a first detecting signal, a second detecting signal and a dimming signal, an on-time period of the first switch in an operation cycle is calculated. Consequently, the power converting unit generates an output current corresponding to the dimming signal in order to control the brightness of the light-emitting diode. Moreover, the dimming accuracy of the dimming driver circuit of the present invention is largely enhanced. Moreover, since the dimming driver circuit of the present invention has simplified circuitry, the dimming driver circuit is cost-effective.

In accordance with an aspect of the present invention, there is provided a dimming driver circuit for adjusting brightness of a light emitting diode. The dimming driver circuit includes a power converting unit, an input voltage detection unit, an output voltage detection unit, a driving unit and a control unit. The power converting unit includes input terminals for receiving an input voltage, output terminals for outputting an output voltage and at least a first switch. The power converting unit converts the input voltage into the output voltage according to an operation of the first switch. The input voltage detection unit is electrically connected with the input terminals for detecting a voltage of the input voltage and generating a first detecting signal according to a detecting result of the input voltage detection unit. The output voltage detection unit is electrically connected with the output terminals for detecting a voltage of the output voltage and generating a second detecting signal according to a detecting result of the output voltage detection unit. The driving unit is electrically connected with the at least one first switch for driving the at least one first switch. The control unit is electrically connected with the driving unit, the input voltage detection unit and the output voltage detection unit. The control unit calculates an on-time period of the at least one first switch in an operation cycle according to the first detecting signal, the second detecting signal and a dimming signal. The control unit generates a control signal to the driving unit according to the on-time period. The driving unit adjusts the operation of the at least one first switch to comply with the on-time period according to the control signal. The power converting unit generates an output current corresponding to the dimming signal to control the brightness of the light-emitting diode.

In accordance with another aspect of the present invention, there is provided a control method for the above dimming driver circuit. The control method includes the following steps. Firstly, a first detecting signal is generated according to the input voltage, and a second detecting signal is generated according to the output voltage. Then, a dimming signal is received and processed to generate a reference current. Then, an on-time period of the switch in an operation cycle is calculated according to the first detecting signal, the second detecting signal and the reference current, and a calculating result is outputted. Then, a control signal is generated according to the calculating result, and an operation of the switch is controlled. Consequently, an output current corresponding to the dimming signal is outputted from the power converting unit to the light emitting diode.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
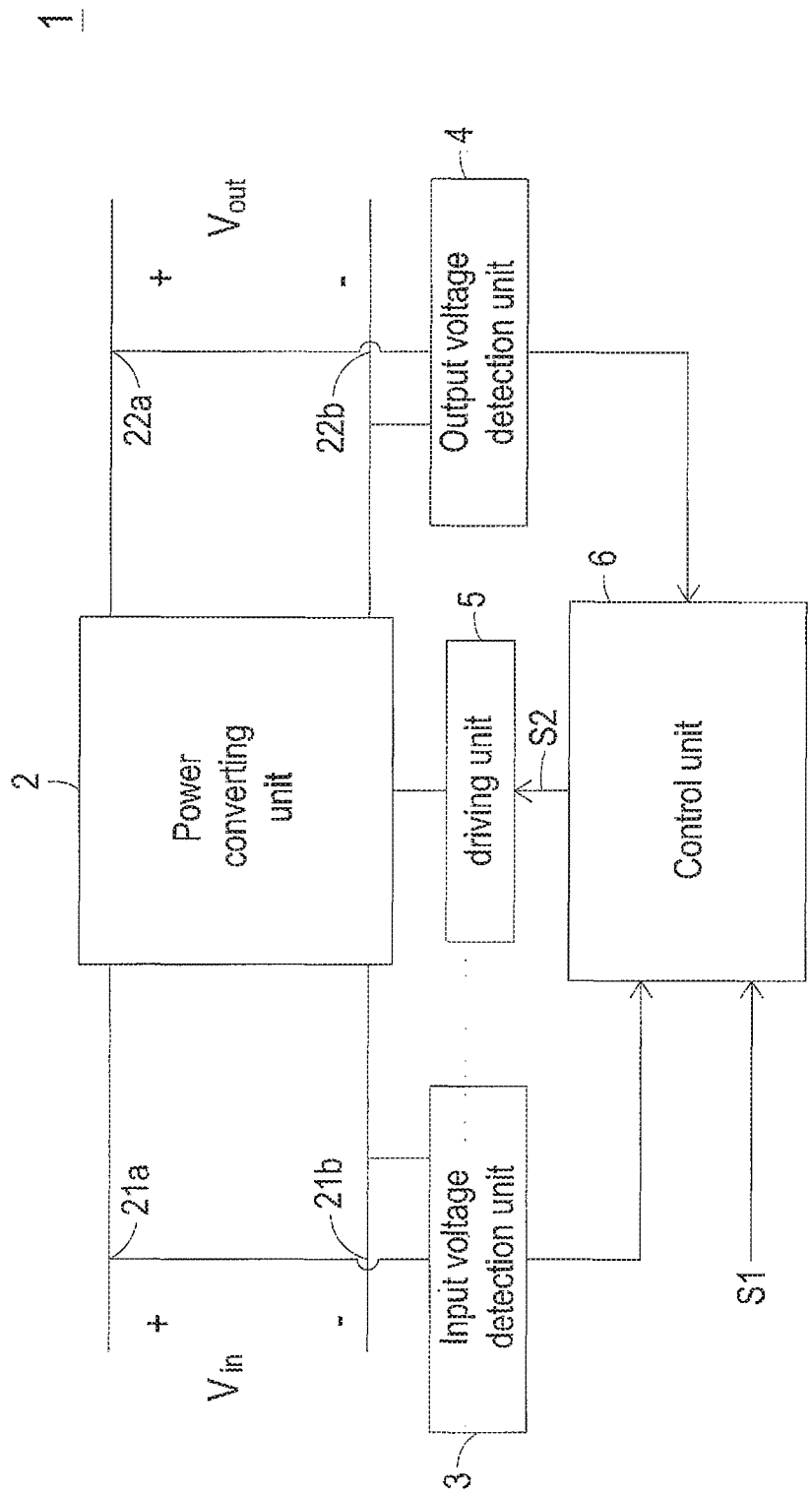
FIG. 1 is a schematic functional block diagram illustrating a dimming driver circuit according to an embodiment of the present invention.

FIG. 1 is a schematic functional block diagram illustrating a dimming driver circuit according to an embodiment of the present invention. As shown in FIG. 1, the dimming driver circuit 1 is used for adjusting the brightness of a light-emitting element such as a light emitting diode. The dimming driver circuit 1 comprises a power converting unit 2, an input voltage detection unit 3, an output voltage detection unit 4, a driving unit 5 and a control unit 6.

Figure 2:
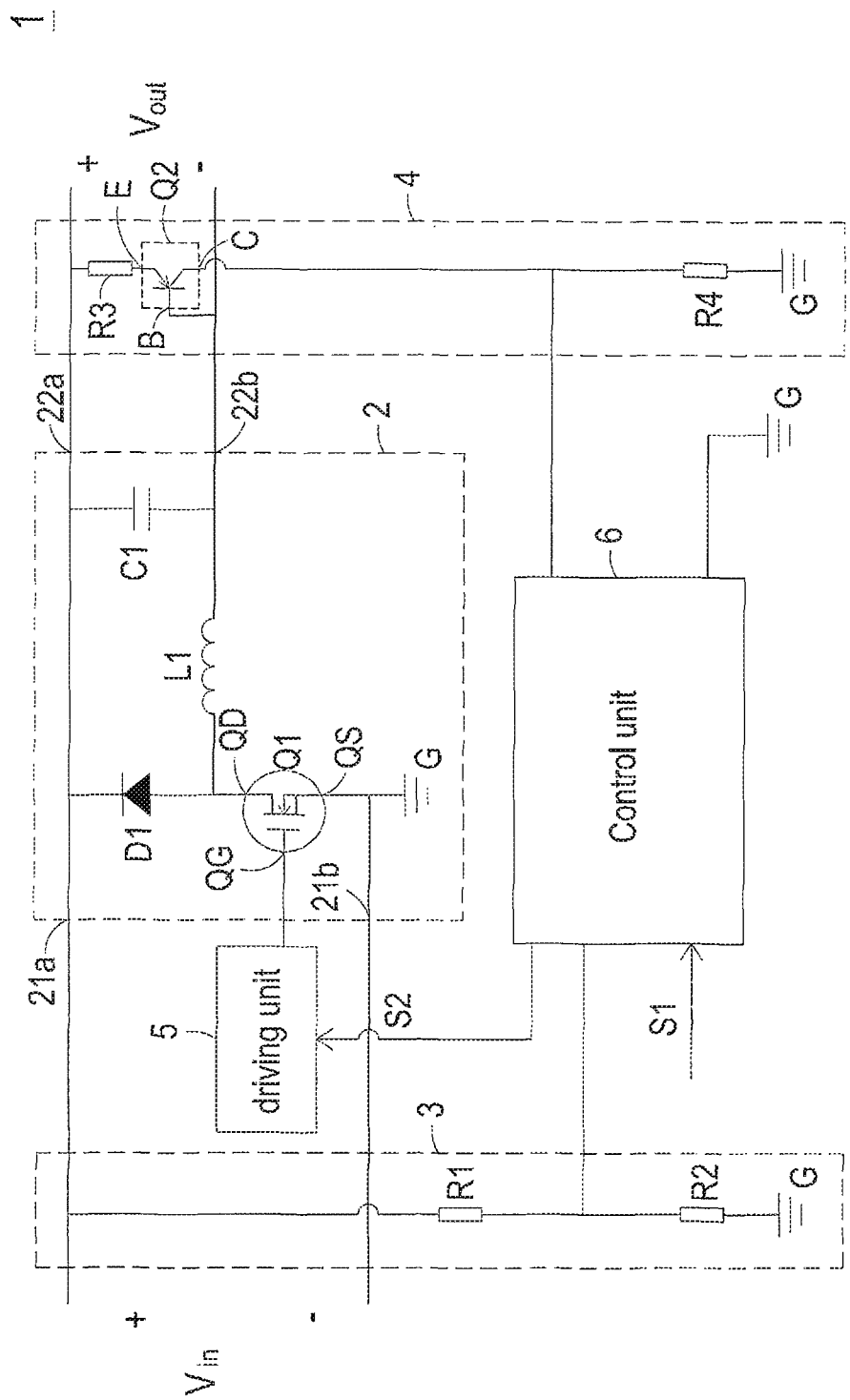
FIG. 2 is a schematic circuit diagram illustrating an exemplary circuitry of the power converting unit, the input voltage detection unit and the output voltage detection unit of the dimming driver circuit of FIG. 1.

The power converting unit 2 comprises two input terminals, two output terminals and a first switch Q1 (see FIG. 2). The input terminals include a positive input terminal 21a and a negative input terminal 21b. The output terminals include a positive output terminal 22a and a negative output terminal 22b. The power converting unit 2 receives an input voltage Vin from the input terminals. During operation of the first switch Q1 of the power converting unit 2, the input voltage Vin is converted into an output voltage Vout. The output voltage Vout is outputted from the output terminals to the light-emitting element. Consequently, the light-emitting element is driven to illuminate.

The input voltage detection unit 3 is electrically connected with the positive input terminal 21a and the negative input terminal 21b of the power converting unit 2 in order to detect the voltage of the input voltage Vin. According to the detecting result, the input voltage detection unit 3 generates a first detecting signal.

The output voltage detection unit 4 is electrically connected with the positive output terminal 22a and the negative output terminal 22b in order to detect the voltage of the output voltage Vout. According to the detecting result, the output voltage detection unit 4 generates a second detecting signal.

The driving unit 5 is electrically connected with a control terminal QG of the first switch Q1 for turning on or turning off the first switch Q1.

The control unit 6 is electrically connected with the driving unit 5, the input voltage detection unit 3 and the output voltage detection unit 4 for receiving the first detecting signal, the second detecting signal and a dimming signal S1. According to the dimming signal S1, the control unit 6 adjusts the brightness of the light emitting diode. According to the first detecting signal, the second detecting signal and the dimming signal S1, the control unit 6 calculates an on-time period of the first switch Q1 in an operation cycle. Moreover, the control unit 6 outputs a control signal S2 to the driving unit 5 according to the on-time period. According to the control signal S2, the driving unit 5 drives the operation of the first switch Q1 to comply with the on-time period. Consequently, the power converting unit 2 generates an output current corresponding to the dimming signal S1 in order to control the brightness of the light-emitting diode.

FIG. 2 is a schematic circuit diagram illustrating an exemplary circuitry of the power converting unit, the input voltage detection unit and the output voltage detection unit of the dimming driver circuit of FIG. 1. An example of the power converting unit 2 includes but is not limited to a buck converter, a boost converter or a buck-boost converter. For example, as shown in FIG. 2, the power converting unit 2 is a buck converter. The power converting unit 2 comprises a diode D1, an inductor L1, a capacitor C1 and the first switch Q1. The first switch Q1 has a first terminal QS, a second terminal QD and a control terminal QG. For example, the first switch Q1 is a metal-oxide-semiconductor field-effect transistor (MOSFET). Consequently, the first terminal QS is a source terminal, the second terminal QD is drain terminal, and the control terminal QG is a gate terminal. The first terminal QS of the first switch Q1 is electrically connected with a ground terminal G and the negative input terminal 21b of the power converting unit 2. The control terminal QG of the first switch Q1 is electrically connected with the driving unit 5. A cathode of the diode D1 is electrically connected with the positive input terminal 21a of the power converting unit 2, a first end of the capacitor C1 and the positive output terminal 22a of the power converting unit 2. An anode of the diode D1 is electrically connected with the second terminal QD of the first switch Q1 and a first end of the inductor L1. A second end of the inductor L1 is electrically connected with a second end of the capacitor C1 and the negative output terminal 22b of the power converting unit 2. The second end of the capacitor C1 is electrically connected with the negative output terminal 22b of the power converting unit 2.

The input voltage detection unit 3 comprises a first resistor R1 and a second resistor R2. A first end of the first resistor R1 is electrically connected with the positive input terminal 21a of the power converting unit 2. A second end of the first resistor R1 is electrically connected with a first end of the second resistor R2 and the control unit 6. A second end of the second resistor R2 is electrically connected with the ground terminal G.

The output voltage detection unit 4 comprises a third resistor R3, a fourth resistor R4 and a second switch Q2. A first end of the third resistor R3 is electrically connected with the positive output terminal 22a of the power converting unit 2. A first end of the fourth resistor R4 is electrically connected with the ground terminal G. A second end of the fourth resistor R4 is electrically connected with the control unit 6. The second switch Q2 comprises a control terminal B, a third terminal E and a fourth terminal C. The third terminal E is electrically connected with a second end of the third resistor R3. The fourth terminal C is electrically connected with the second end of the fourth resistor R4 and the control unit 6. The control terminal B is electrically connected with the negative output terminal 22b of the power converting unit 2. In this embodiment, the second switch Q2 is a bipolar junction transistor (BJT). That is, the control terminal B is a base, the third terminal E is an emitter, and the fourth terminal C is collector.

In this embodiment, a voltage divider is defined by the third resistor R3, the fourth resistor R4 and the second switch Q2 of the output voltage detection unit 4 collaboratively. That is, after the output voltage Vout is subjected to a voltage division, the output voltage Vout is proportionally decreased and thus the second detecting signal is generated. Consequently, the voltage of the second detecting signal is equal to (Vout−Vbe)×R4/R3. In this formula, Vbe is a forward bias voltage of the second switch Q2, Vout is the output voltage, R4 is the resistance of the fourth resistor, and R3 is the resistance of the third resistor. Similarly, another voltage divider is defined by the first resistor R1 and the second resistor R2 of the input voltage detection unit 3 collaboratively. That is, after the input voltage Vin is subjected to a voltage division, the input voltage Vin is proportionally decreased and thus the first detecting signal is generated. It is noted that the components of the power converting unit 2, the input voltage detection unit 3 and the output voltage detection unit 4 and relationships between these components may be altered according to the practical requirements.

Figure 3:
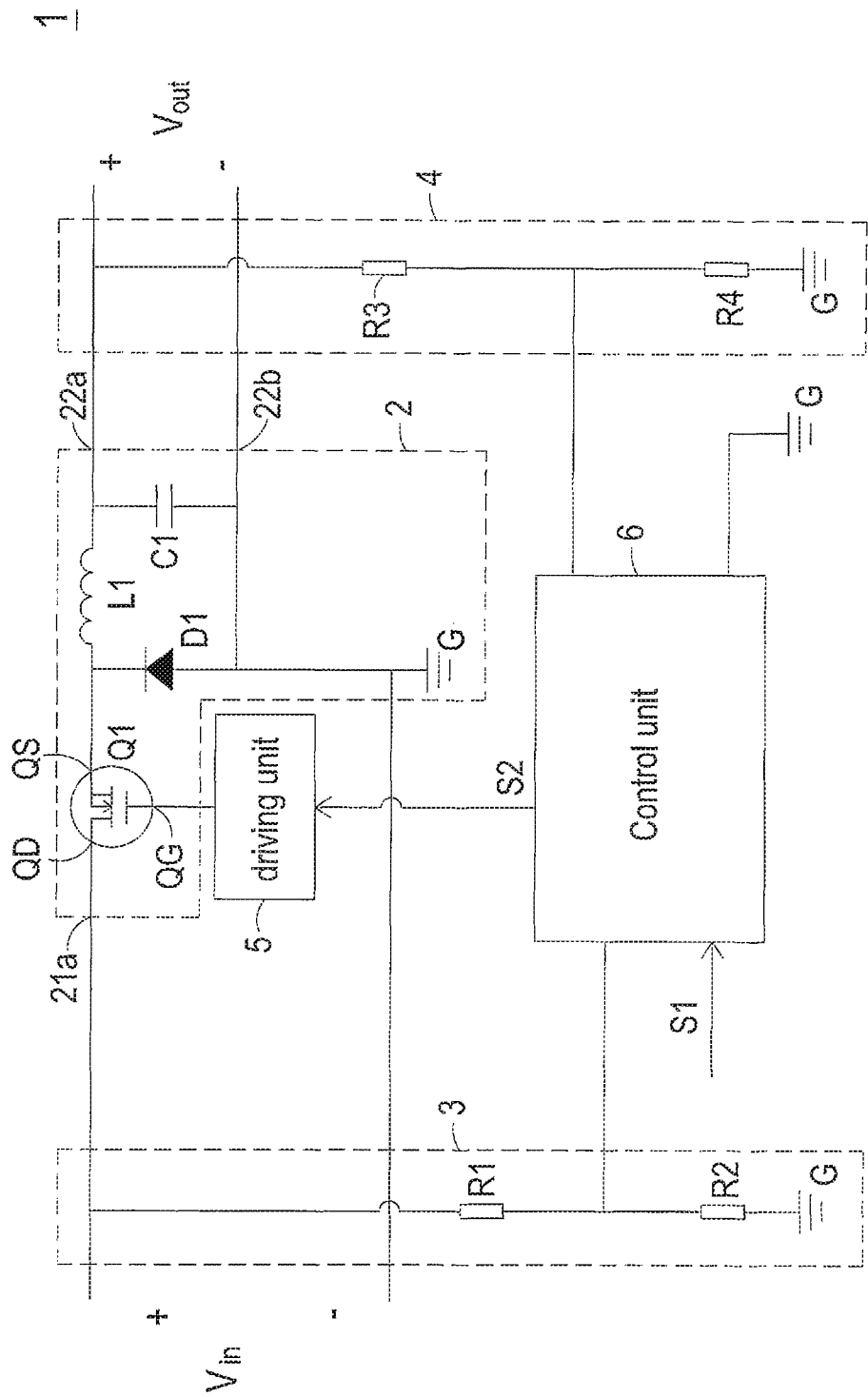
FIG. 3 is a schematic circuit diagram illustrating another exemplary circuitry of the power converting unit, the input voltage detection unit and the output voltage detection unit of the dimming driver circuit of FIG. 1.

FIG. 3 is a schematic circuit diagram illustrating another exemplary circuitry of the power converting unit, the input voltage detection unit and the output voltage detection unit of the dimming driver circuit of FIG. 1. The power converting unit 2 comprises a diode D1, an inductor L1, a capacitor C1 and a first switch Q1. The first switch Q1 has a first terminal QS, a second terminal QD and a control terminal QG. For example, the first switch Q1 is a metal-oxide-semiconductor field-effect transistor (MOSFET). Consequently, the first terminal QS is a source terminal, the second terminal QD is drain terminal, and the control terminal QG is a gate terminal. The second terminal QD of the first switch Q1 is electrically connected with the positive input terminal 21a of the power converting unit 2. The first terminal QS of the first switch Q1 is electrically connected with a cathode of the diode D1 and a first end of the inductor L1. The control terminal QG of the first switch Q1 is electrically connected with the driving unit 5. An anode of the diode D1 is electrically connected with the negative output terminal 22b of the power converting unit 2 and the ground terminal G. A second end of the inductor L1 is electrically connected with a first end of the capacitor C1 and the positive output terminal 22a of the power converting unit 2. A second end of the capacitor C1 is electrically connected with the negative output terminal 22b of the power converting unit 2.

The input voltage detection unit 3 comprises a first resistor R1 and a second resistor R2. A first end of the first resistor R1 is electrically connected with the positive input terminal 21a of the power converting unit 2. A second end of the first resistor R1 is electrically connected with a first end of the second resistor R2 and the control unit 6. A second end of the second resistor R2 is electrically connected with the ground terminal G.

The output voltage detection unit 4 comprises a third resistor R3 and a fourth resistor R4. A first end of the third resistor R3 is electrically connected with the positive output terminal 22a of the power converting unit 2. A first end of the fourth resistor R4 is electrically connected with the ground terminal G. A second end of the fourth resistor R4 is electrically connected with the control unit 6 and a second end of the third resistor R3.

In this embodiment, a voltage divider is defined by the third resistor R3 and the fourth resistor R4 of the output voltage detection unit 4 collaboratively. That is, after the output voltage Vout is subjected to a voltage division, the output voltage Vout is proportionally decreased and thus the second detecting signal is generated. Consequently, the voltage of the second detecting signal is equal to (Vout)×R4/R3. In this formula, Vout is the output voltage, R4 is the resistance of the fourth resistor, and R3 is the resistance of the third resistor. Similarly, another voltage divider is defined by the first resistor R1 and the second resistor R2 of the input voltage detection unit 3 collaboratively. That is, after the input voltage Vin is subjected to a voltage division, the input voltage Vin is proportionally decreased and thus the first detecting signal is generated. It is noted that the components of the power converting unit 2, the input voltage detection unit 3 and the output voltage detection unit 4 and relationships between these components may be altered according to the practical requirements. The operations and principles of the dimming driver circuit of FIG. 3 are similar to that of the dimming driver circuit of FIG. 2, and are not redundantly described herein.

Figure 4:
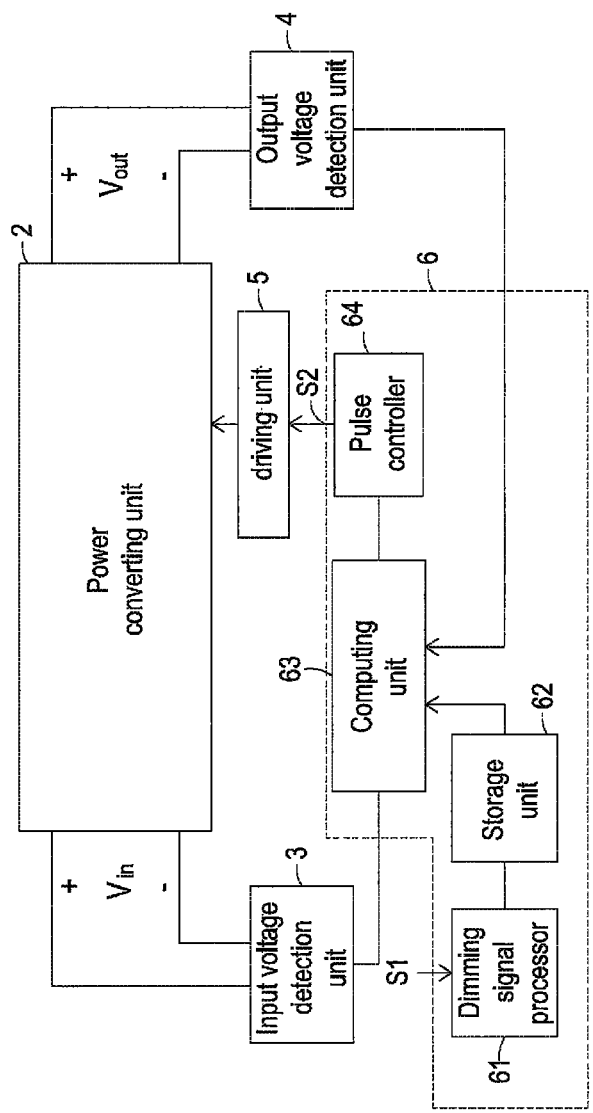
FIG. 4 is a schematic circuit diagram illustrating the detailed circuitry of the control unit of the dimming driver circuit of FIG. 1.

FIG. 4 is a schematic circuit diagram illustrating the detailed circuitry of the control unit of the dimming driver circuit of FIG. 1. As shown in FIG. 4, the control unit 6 comprises a dimming signal processor 61, a storage unit 62, a computing unit 63 and a pulse controller 64. The dimming signal processor 61 receives the dimming signal S1 and generates a reference current according to the dimming signal S1. The storage unit 62 is electrically connected with the dimming signal processor 61 in order to store the reference current. The computing unit 63 is electrically connected with the storage unit 62, the input voltage detection unit 3 and the output voltage detection unit 4. The computing unit 63 reads the reference current stored in the storage unit 62 and calculates the on-time period of the first switch Q1 in the operation cycle according to the reference current, the first detecting signal and the second detecting signal, and then the computing unit 63 outputs a calculating result. The pulse controller 64 is electrically connected with the computing unit 63 and the driving unit 5 for receiving the calculating result from the computing unit 63 and generating the control signal S2 according to the calculating result.

In some embodiments, a current threshold is stored in the computing unit 63. If the reference current is higher than the current threshold, the computing unit 63 calculates the on-time period of the first switch Q1 in the operation cycle according to the reference current, the first detecting signal and the second detecting signal and outputs the calculating result to the pulse controller 64. Whereas, if the reference current is lower than the current threshold, the computing unit 63 calculates the on-time period according to the current threshold, the first detecting signal and the second detecting signal, then calculates a pulse number from the pulse chopping modulation according to the reference current corresponding to the dimming signal S1, and outputs the calculating result to the pulse controller 64.

The pulse controller 64 generates the control signal S2 according to the calculating result of the computing unit 63. According to the control signal S2, the operation of the first switch Q1 is correspondingly adjusted. Consequently, the power converting unit 2 generates an output current corresponding to the dimming signal S1 in order to control the brightness of the light-emitting diode.

When the reference current is lower than the current threshold, the control signal S2 is realized by the pulse chopping modulation and the pulse number of the control signal S2 is equal to the chopped pulse number. In one embodiment, the chopped pulse number from the pulse chopping modulation is presented according to the formula: K=(1−Idim/Imid)×fs/fz. In this formula, K is the chopped pulse number, Idim is the reference current, Imid is the current threshold, fs is a pulse frequency of the control signal S2, and fz is the chopped pulse frequency which usually is times lower than fs.

Figure 5B:
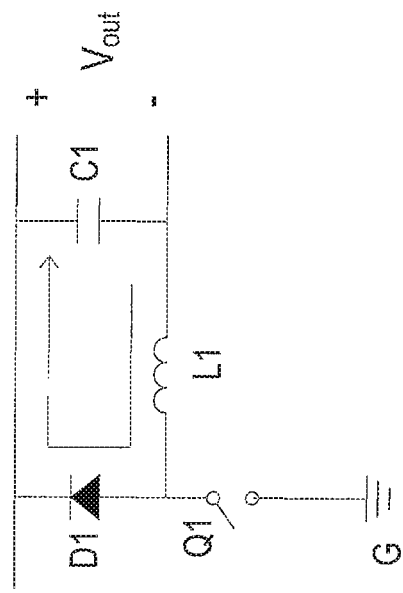
FIG. 5B schematically illustrates the dimming driver circuit of FIG. 2 when the first switch of the dimming driver circuit in an off state.
Figure 5A:
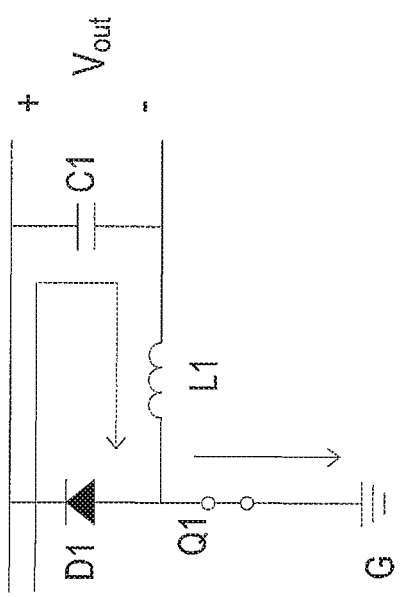
FIG. 5A schematically illustrates the dimming driver circuit of FIG. 2 when the first switch of the dimming driver circuit in an on state.
Figure 6:
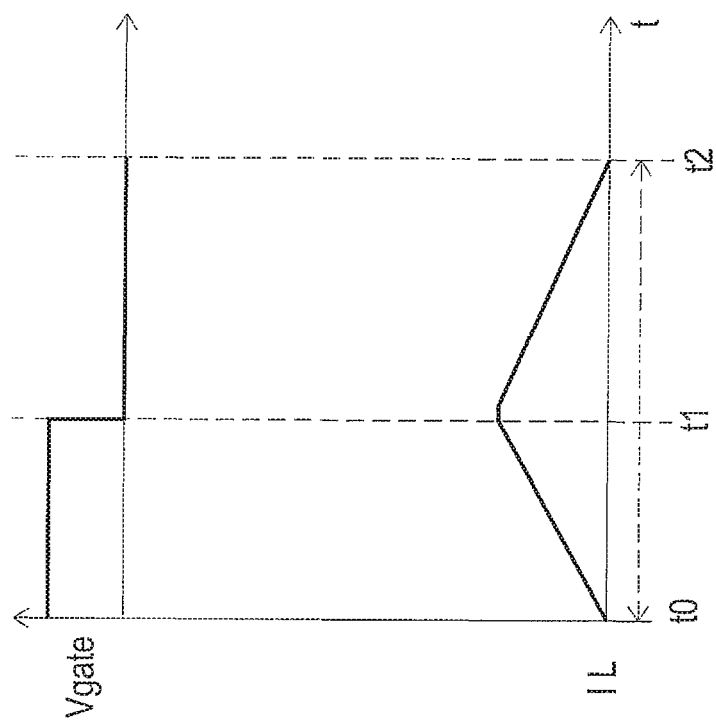
FIG. 6 is a schematic timing waveform diagram illustrating associated signals of the dimming driver circuit according to the first embodiment of the present invention.

FIG. 5A schematically illustrates the dimming driver circuit of FIG. 2 when the first switch of the dimming driver circuit is in an on state. FIG. 5B schematically illustrates the dimming driver circuit of FIG. 2 when the first switch is in an off state. FIG. 6 is a schematic timing waveform diagram illustrating associated signals of the dimming driver circuit according to the first embodiment of the present invention. When the first switch Q1 is turned on, the current in the power converting unit 2 flows along a direction as shown in FIG. 5A. That is, the current flows to the ground terminal G through the capacitor C1, the inductor L1 and the first switch Q1 and the inductor L1 is charged. As shown in FIG. 6, in the time interval between t0 and t1, the control voltage Vgate at the control terminal QG of the first switch Q1 is in a high level state. Consequently, the first switch Q1 is in the on state. Meanwhile, the inductor L1 is charged, and the average current IL of the inductor L1 gradually increases. The average current IL of the inductor L1 can be expressed by the following formulae:

$$IL_{on}(t)=(Vin-Vout) \times t/L \qquad (1)$$

$$Ipk=(Vin-Vout) \times Ton/L \qquad (2)$$

In the above formulae, $IL_{on}(t)$ is a function of time for the current flowing through the inductor L1 when the first switch Q1 is in the on state, Ipk is a current value of the inductor L1 at the time point t1, Vin is a voltage value of the input voltage, Vout is a voltage value of the output voltage, $T_{on}$ is the on-time period of the first switch Q1 in the operation cycle, and L is the inductance of the inductor L1.

When the first switch Q1 is turned off, the current in the power converting unit 2 flows along a direction as shown in FIG. 5B. That is, the current flows from the inductor L1 to the capacitor C1 through the anode of the diode D1 and the cathode of the diode D1. As shown in FIG. 6, in the time interval between t1 and t2, the control voltage Vgate at the control terminal QG of the first switch Q1 is in a low level state. Consequently, the first switch Q1 is in the off state. Meanwhile, the inductor L1 is discharged and the average current IL of the inductor L1 gradually decreases. The average current IL of the inductor L1 can be expressed by the following formulae:

$$IL_{off}(t)=Ipk-Vout \times t/L \qquad (3)$$

$$IL_{T\_off}=Ipk-Vout \times T_{off}/L \qquad (4)$$

In the above formulae, $IL_{off}(t)$ is a function of time for the current flowing through the inductor L1 when the first switch Q1 is in the off state, $IL_{T\_off}$ is a current value of the inductor L1 at the time point t1, and $T_{off}$ is the off-time period of the first switch Q1 in the operation cycle. When the power converting unit 2 is operated in a discontinuous current mode, $IL_{T\_off}=0$. Consequently, the following formulae are obtained:

$$0=Ipk-Vout \times T_{off}/L \qquad (5)$$

$$IL_{avg}=Ipk/2 \times (T_{on}+T_{off})/Ts \qquad (6)$$

$$Ts=1/fs \qquad (7)$$

In the above formulae, $IL_{avg}$ is the average current flowing through the inductor L1 when the first switch Q1 is in the off state, Ts is the operation cycle of the first switch Q1, and fs is the operation frequency of the first switch Q1. Moreover, fs is also the pulse frequency of the control signal S2.

After the formulae (2), (5) and (7) are introduced into the formula (6), the following formula is obtained:

$$Iout = IL_{avg} = \frac{Ton \times (Vin-Vout)}{2 \times L} \times \frac{Ton \times [Ton \times (Vin-Vout)]/Vout}{\frac{1}{fs}} \qquad (8)$$

In the above formula, Iout is the output current of the power converting unit 2. In the formula (8), the inductance L of the inductor L1 and the pulse frequency fs of the control signal S2 are constant values, and the voltage value of the input voltage Vin, the voltage value of the output voltage Vout and the on-time period Ton of the first switch Q1 are variable values.

The on-time period Ton may be calculated by the following formula:

$$Ton = \sqrt{Idim \times \frac{2 \times L}{VinAD-VoutAD} \times \frac{\frac{1}{fs}}{1+\frac{(VinAD-VoutAD)}{VoutAD}}} \qquad (9)$$

In the above formula: Idim is the reference current corresponding to the dimming signal S1, VinAD is the first detecting signal, and VoutAD is the second detecting signal. Moreover, Idim is a variable value.

From the formula (9), the on-time period of the first switch Q1 in the operation cycle is obtained according to the reference current corresponding to the dimming signal S1, the input voltage Vin and the output voltage Vout. In case that the input voltage Vin and the output voltage Vout are constant voltages, the output current from the power converting unit 2 is determined according to the on-time period.

Consequently, if the on-time period is fixed, the output current is fixed. Under this circumstance, the output current is controlled in a constant-current control manner. From the formula (8), if the reference current corresponding to the dimming signal S1 is reduced, the on-time period and the output current are also reduced. Consequently, the output current is determined according to the input voltage Vin, the output voltage Vout and the reference current corresponding to the dimming signal S1. Under this circumstance, the brightness of the light emitting diode can be adjusted without the need of detecting the output current from the power converting unit 2.

From the above descriptions, the dimming driver circuit 1 uses the input voltage detection unit 3 and the output voltage detection unit 4 for detecting the input voltage Vin and the output voltage Vout of the power converting unit 2, and uses the control unit 6 to calculate and adjust the on-time period of the first switch Q1 in the on state. Consequently, the power converting unit 2 outputs the output current corresponding to the dimming signal S1. In one embodiment, since it is not necessary to install the current detection resistor in the dimming driver circuit 1 of the present invention, the problem of generating the error signal from the use of the current detection resistor will be eliminated. Consequently, the dimming accuracy of the dimming driver circuit 1 of the present invention is largely enhanced. In other embodiment, since the dimming driver circuit 1 of the present invention has simplified circuitry and the input voltage detection unit 3 and the output voltage detection unit 4 are cost-effective, the manufacturing cost of the dimming driver circuit 1 is low.

Figure 7:
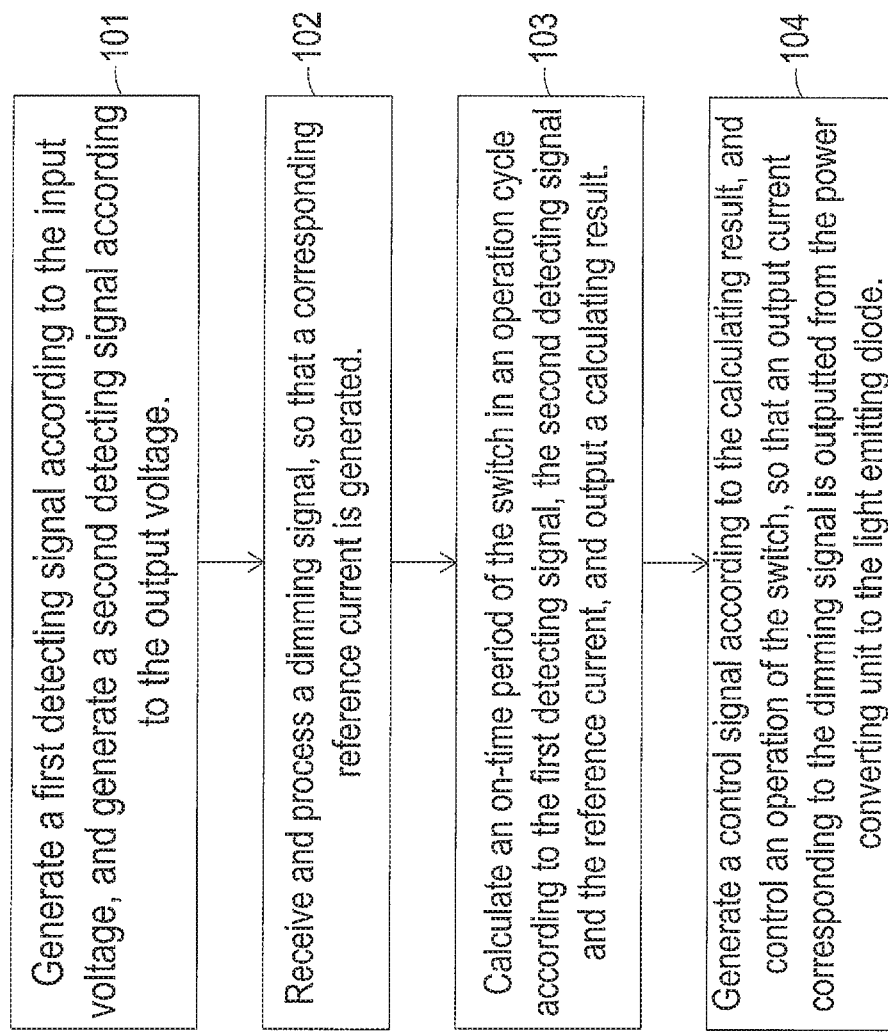
FIG. 7 is a flowchart illustrating a control method of the dimming driver circuit of FIG. 1.

FIG. 7 is a flowchart illustrating a control method of the dimming driver circuit of FIG. 1. Firstly, in a step 101, the input voltage detection unit 3 detects the input voltage Vin of the power converting unit 2 and outputs the first detecting signal according to the detecting result, and the output voltage detection unit 4 detects the output voltage Vout of the power converting unit 2 and outputs the second detecting signal according to the detecting result. Then, in a step 102, the control unit 6 receives the dimming signal S1 and processes the dimming signal S1, so that a reference current corresponding to the dimming signal S1 is generated. Then, in a step 103, the control unit 6 receives the first detecting signal from the input voltage detection unit 3, the second detecting signal from the output voltage detection unit 4 and the reference current. Moreover, after an on-time period of the first switch Q1 in an operation cycle is calculated according to the first detecting signal, the second detecting signal and the reference current, a calculating result is outputted. Then, in a step 104, the control unit 6 outputs a control signal S2 to the driving unit 5 according to the on-time period. According to the control signal S2, the driving unit 5 drives the operation of the first switch Q1 to comply with the on-time period. Consequently, the power converting unit 2 generates an output current corresponding to the dimming signal S1 in order to control the brightness of the light-emitting diode.

Figure 8:
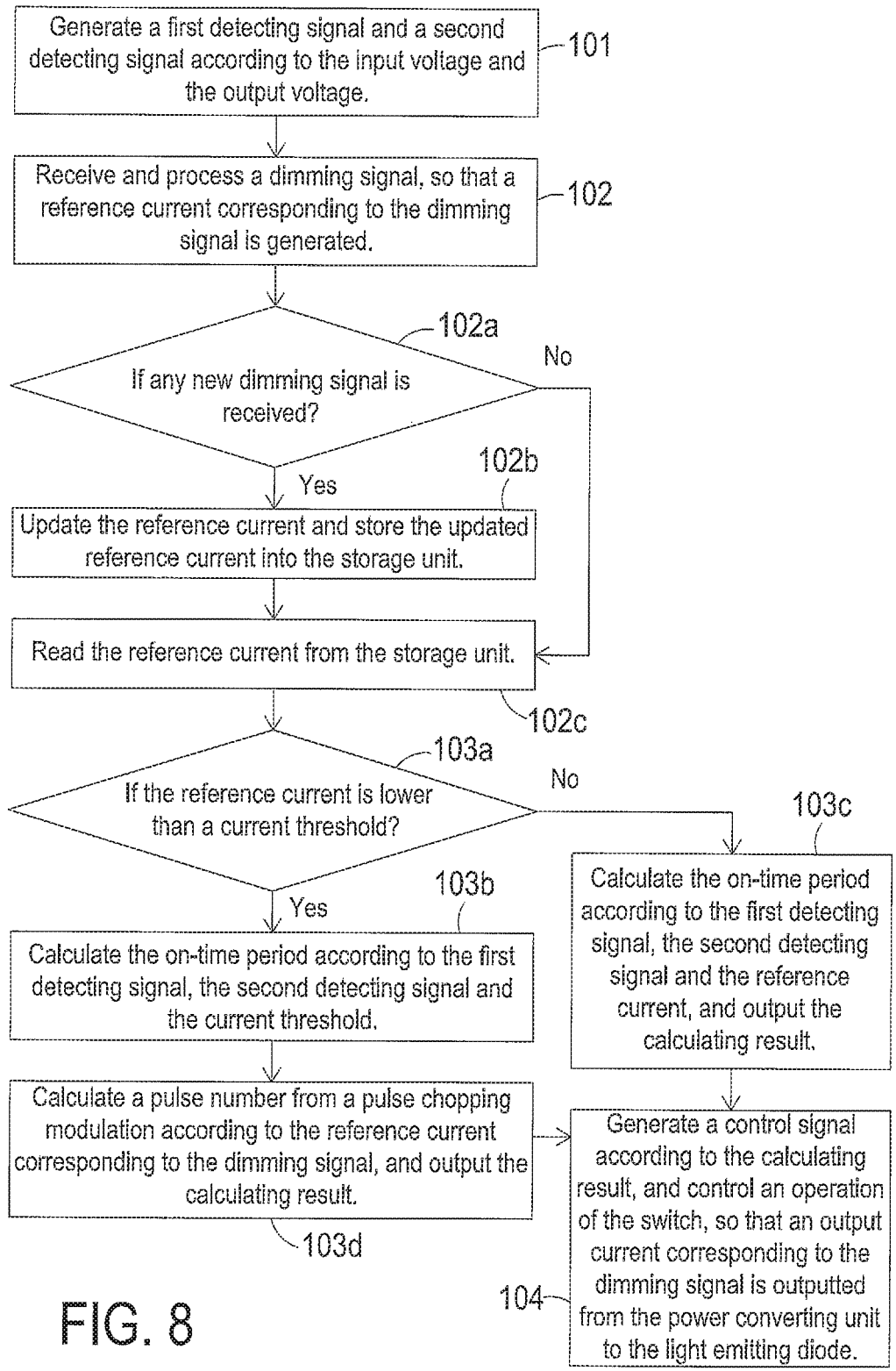
FIG. 8 is a flowchart illustrating a variant example of a control method of the dimming driver circuit according to the embodiment of the present invention.

FIG. 8 is a flowchart illustrating a variant example of a control method of the dimming driver circuit according to the embodiment of the present invention. The control method further comprises steps 102a, 102b and 102c between the step 102 and the step 103. After the step 102, the step 102a is performed to judge whether any new dimming signal S1 is received by the dimming signal processor 61 in order to determine whether the corresponding reference current is updated. If the judging result of the step 102a indicates that the dimming signal processor 61 receives a new dimming signal S1, the reference current corresponding to the new dimming signal S1 is updated and stored in the storage unit 62 (i.e., the step 102b). In the step 102c, the computing unit 63 reads the reference current from the storage unit 62. After the step 102c, the step 103 is performed. Moreover, if the judging result of the step 102a indicates that no new dimming signal S1 is received by the dimming signal processor 61, the step 102c is repeatedly done.

In some embodiments, the step 103 comprises steps 103a, 103b, 103c and 103d. After the step 102, the step 103a is performed. That is, the computing unit 63 judges whether the reference current stored in the storage unit 62 is lower than a current threshold. If the judging result of the step 103a indicates that the reference current is lower than the current threshold, the step 103b is performed. In the step 103b, the on-time period of the first switch Q1 in the operation cycle is calculated according to the current threshold, the first detecting signal and the second detecting signal. Then, in the step 103d, the computing unit 63 calculates a chopped pulse number from a pulse chopping modulation according to the reference current corresponding to the dimming signal S1, and outputs the calculating result to the pulse controller 64. Then, the step 104 is performed. That is, the control unit 6 outputs a control signal S2 to the driving unit 5 according to the on-time period obtained in the step 103b and the chopped pulse number obtained in the step 103d. According to the control signal S2, the driving unit 5 drives the operation of the first switch Q1 to comply with the on-time period. Consequently, the power converting unit 2 generates an output current corresponding to the dimming signal S1 in order to control the brightness of the light-emitting diode. Whereas, if the judging result of the step 103a indicates that the reference current is not lower than the current threshold, the step 103c is performed. That is, the computing unit 63 calculates the on-time period of the first switch Q1 in the operation cycle according to the first detecting signal, the second detecting signal and the reference current, and the calculating result is outputted. After the step 103c, the step 104 is performed.

Figure 9:
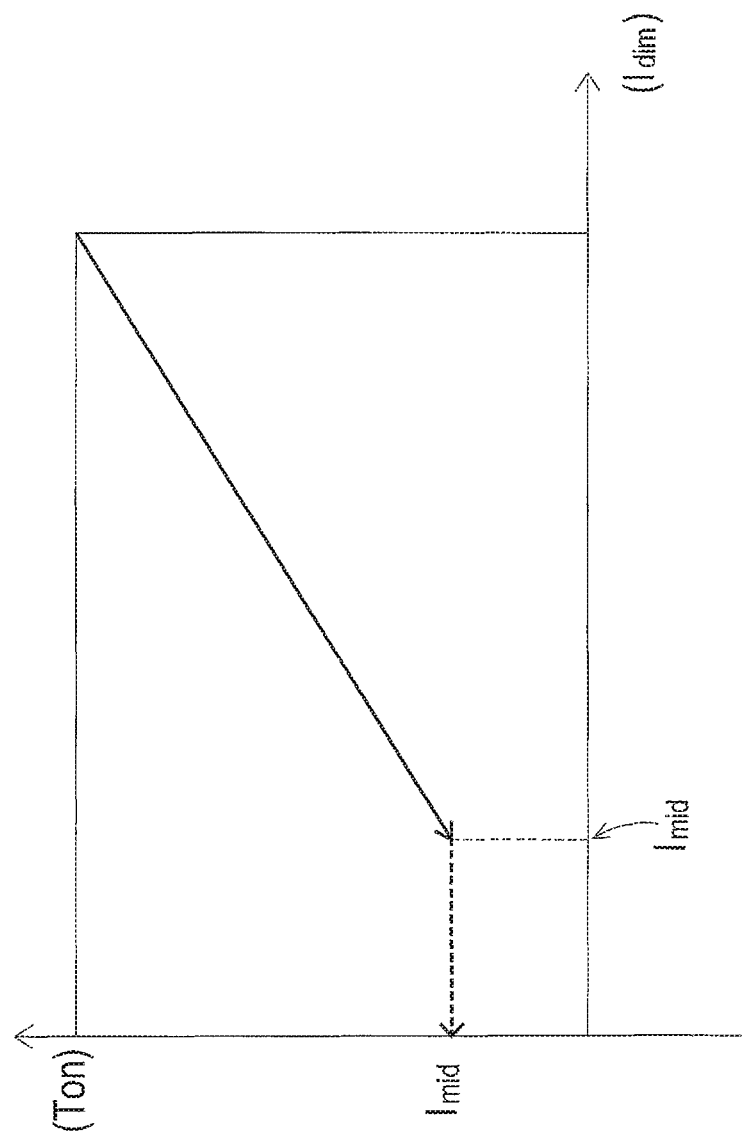
FIG. 9 is a plot illustrating the relationship between the on-time period of the first switch and the reference current corresponding to the dimming signal by using the control method of the present invention.

FIG. 9 is a plot illustrating the relationship between the on-time period of the first switch and the reference current corresponding to the dimming signal by using the control method of the present invention. As shown in FIG. 9, if the computing unit 63 judges that the reference current stored in the storage unit 62 is higher than the current threshold Imid, the on-time period Ton calculated by the computing unit 63 and the reference current Idim are in a linear relationship. That is, the on-time period of the first switch Q1 in the operation cycle is adjusted according to the change of the dimming signal S1. Whereas, if the computing unit 63 judges that the reference current stored in the storage unit 62 is lower than the current threshold Imid, the on-time period is a fixed value, which is equal to the on-time period corresponding to the current threshold Imid.

Figure 10:
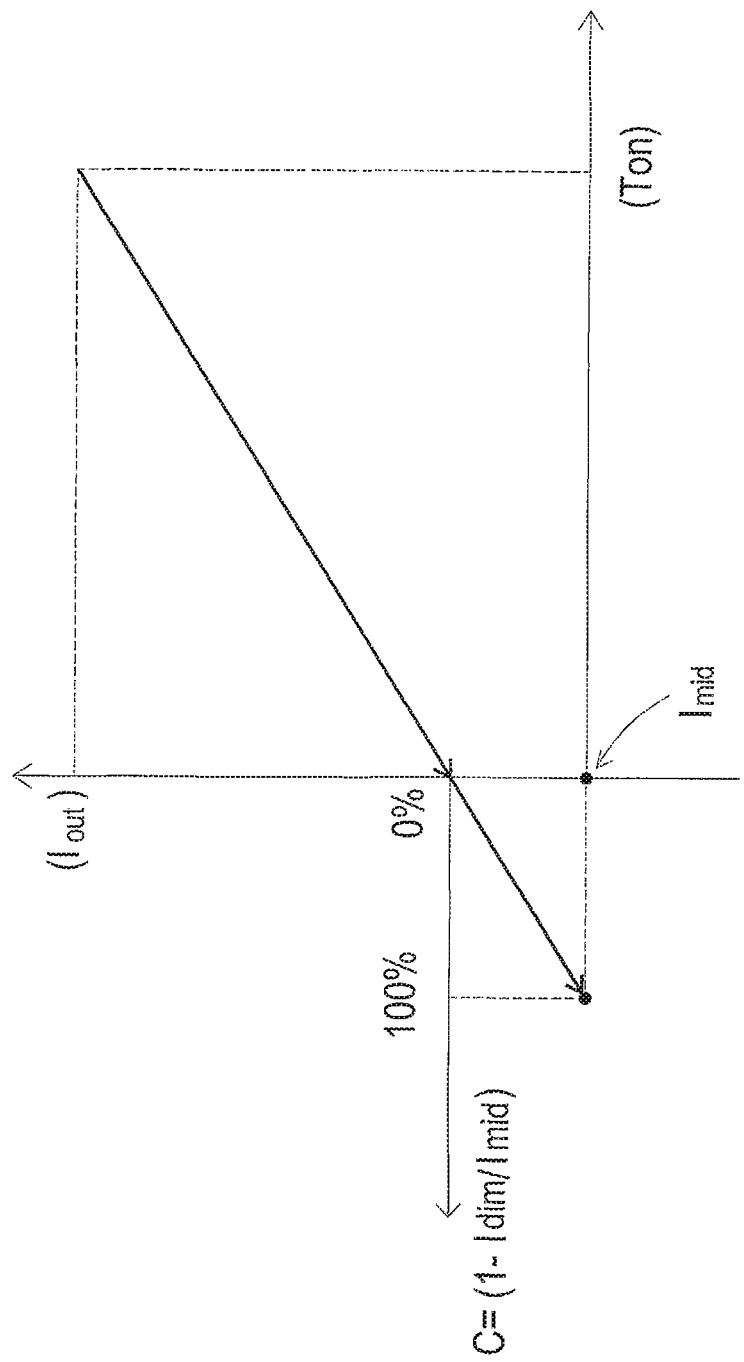
FIG. 10 is a plot illustrating the relationship between the on-time period of the first switch and the output current by using the control method of the present invention.

FIG. 10 is a plot illustrating the relationship between the on-time period of the first switch and the output current by using the control method of the present invention. As shown in FIG. 10, if the computing unit 63 judges that the reference current stored in the storage unit 62 is higher than the current threshold Imid, the output current Iout from the power converting unit 2 and the reference current are in a linear relationship. Whereas, if the computing unit 63 judges that the reference current stored in the storage unit 62 is lower than the current threshold Imid, the proportion of the chopped pulse C is inversely proportional to the output current Iout from the power converting unit 2, wherein the proportion of the chopped pulse C is set as (1−Idim/Imid). Generally, as the proportion of the chopped pulse C of the pulse chopping modulation increases, the output current Iout from the power converting unit 2 decreases. Consequently, if the reference current is lower than the current threshold, the output current from the power converting unit 2 is adjusted to comply with the dimming signal S1 according to the required chopped pulse number of the control signal S2.

Figure 11:
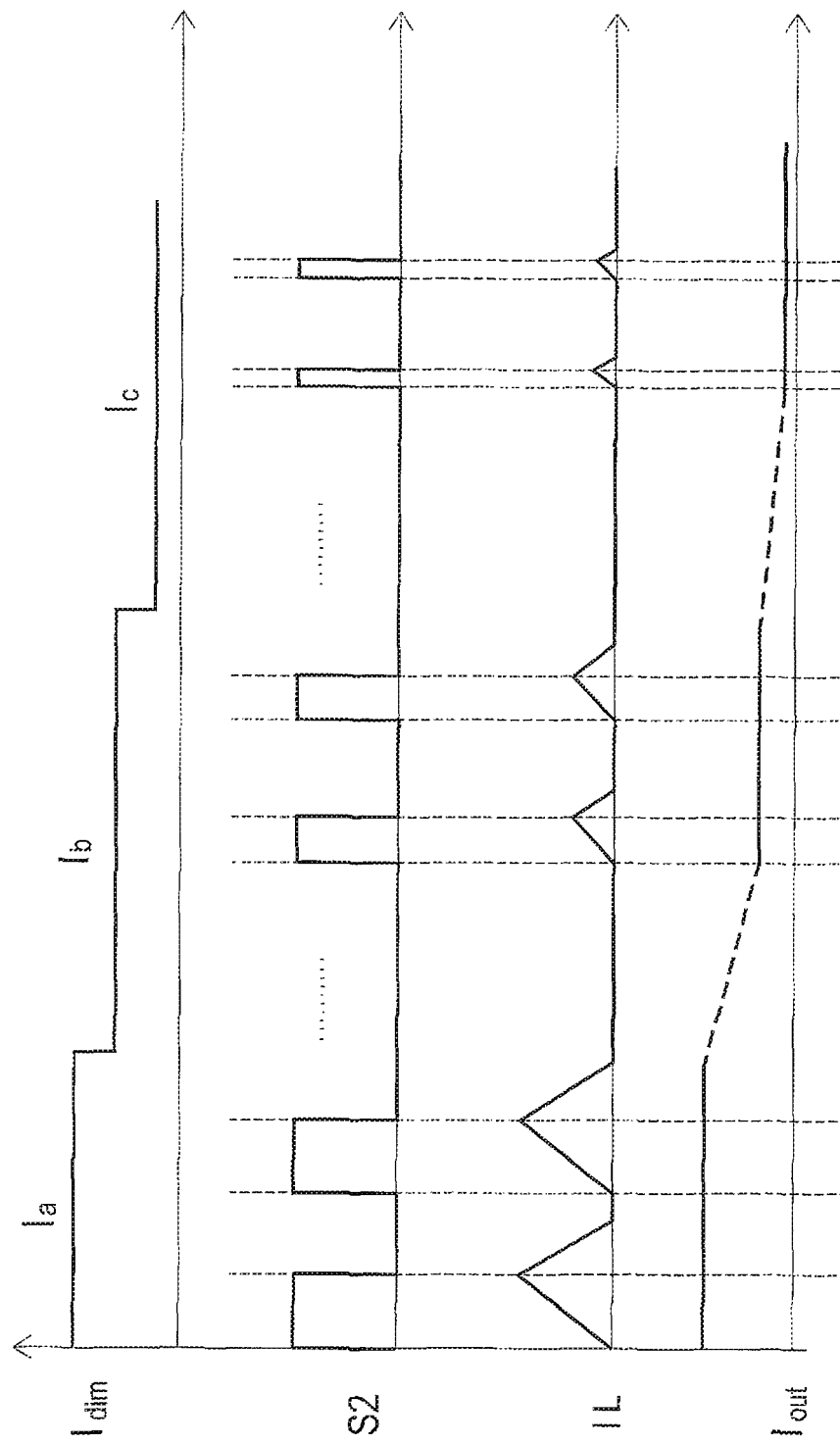
FIG. 11 is a schematic timing waveform diagram illustrating associated signals of the dimming driver circuit when the reference current corresponding to the dimming signal is higher than the current threshold.

FIG. 11 is a schematic timing waveform diagram illustrating associated signals of the dimming driver circuit when the reference current corresponding to the dimming signal is higher than the current threshold. As shown in FIG. 11, if the reference current corresponding to the dimming signal S1 is higher than the current threshold, the on-time period of the control signal S2 is changed with the reference current Idim. For example, as shown in FIG. 11, the current value of the reference current Idim is changed from Ia to Ib and then changed from Ib to Ic (Ia>Ib>Ic). Consequently, the width of the on-time period Ton, the current IL flowing through the inductor L1 and the output current Iout from the power converting unit 2 gradually decreases with the decreasing reference current Idim.

Figure 12:
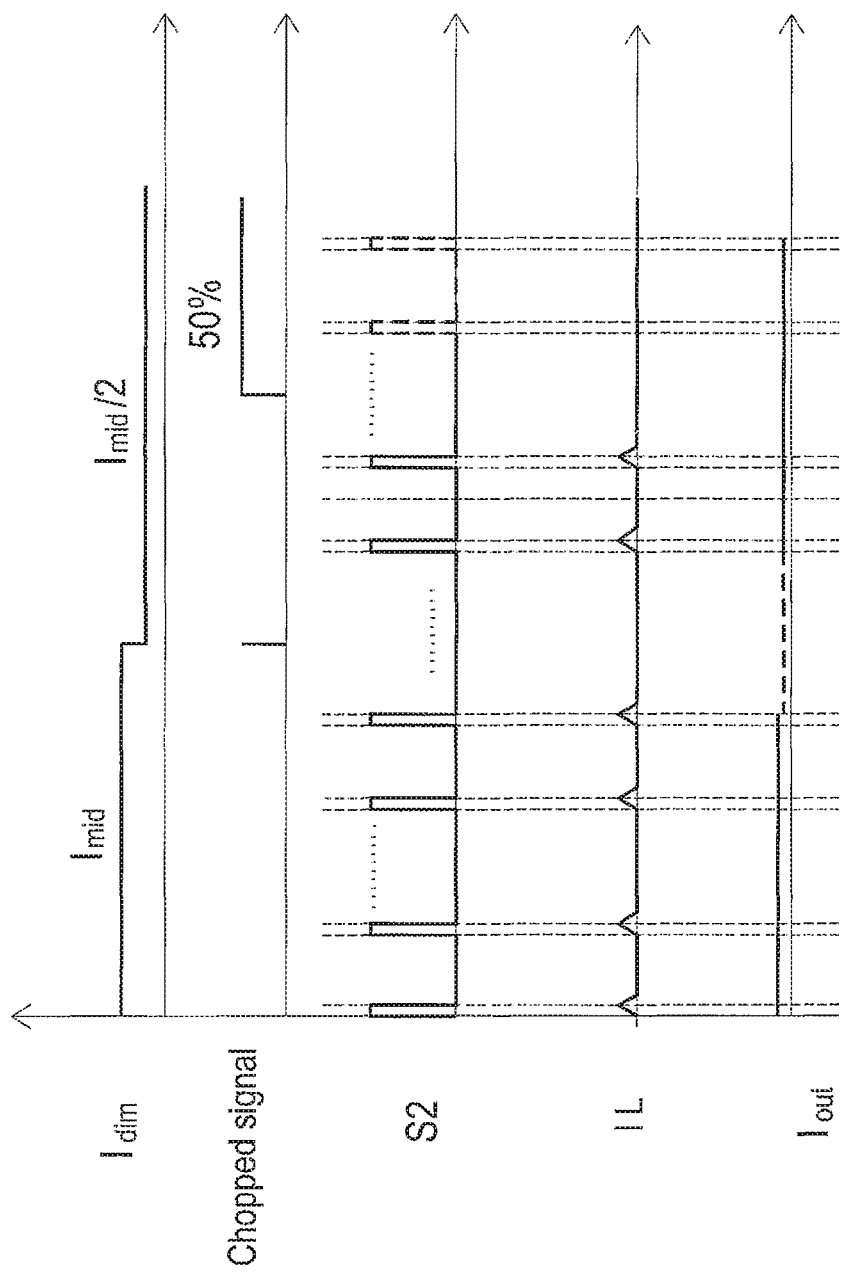
FIG. 12 is a schematic timing waveform diagram illustrating associated signals of the dimming driver circuit when the reference current corresponding to the dimming signal is lower than the current threshold.

FIG. 12 is a schematic timing waveform diagram illustrating associated signals of the dimming driver circuit when the reference current corresponding to the dimming signal is lower than the current threshold. As shown in FIG. 12, if the reference current corresponding to the dimming signal S1 is lower than the current threshold, the chopped pulse number of the control signal S2 is changed according to the change of the reference current corresponding to the dimming signal S1. Please refer to FIG. 12. If the reference current Idim is lower than the current threshold Imid, the chopped pulse number of the control signal S2 is 4. Once the reference current is equal to a half of the current threshold (i.e., Idim=Imid/2), the chopped pulse number of the pulse chopping modulation calculated by the computing unit 63 is 50%. Consequently, after the pulse controller 64 generates two pulses, a high-level chopped signal is generated to shield the two subsequent pulses. That is, the pulse number of the control signal S2 is changed from 4 to 2. Meanwhile, the current IL flowing through the inductor L1 and the output current Iout from the power converting unit 2 gradually decreases. In other words, the output current from the power converting unit 2 can be further reduced according to the chopped signal.

From the above descriptions, the present invention provides a dimming driver circuit. The dimming driver circuit uses the driving circuit for driving the switch of the power converting circuit. Moreover, the input voltage detection unit and the output voltage detection unit with simplified circuitry and low cost are used for detecting associated parameters of the power converting circuit in order to replace the current detection resistor. According to the first detecting signal, the second detecting signal and the dimming signal, the on-time period of the first switch in an operation cycle is calculated. Consequently, the power converting unit generates an output current corresponding to the dimming signal in order to control the brightness of the light-emitting diode. Moreover, the dimming accuracy of the dimming driver circuit of the present invention is largely enhanced. Moreover, since the dimming driver circuit of the present invention has simplified circuitry, the dimming driver circuit is cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dimming driver circuit for adjusting brightness of a light emitting diode, the dimming driver circuit comprising:
   a power converting unit comprising input terminals for receiving an input voltage, output terminals for outputting an output voltage and at least one first switch, wherein the power converting unit converts the input voltage into the output voltage according to an operation of the at least one first switch;
   an input voltage detection unit electrically connected with the input terminals for detecting the input voltage and generating a first detecting signal according to a detecting result of the input voltage detection unit;
   an output voltage detection unit electrically connected with the output terminals for detecting the output voltage and generating a second detecting signal according to a detecting result of the output voltage detection unit;
   a driving unit electrically connected with the at least one first switch for driving the at least one first switch according to a control signal; and
   a control unit electrically connected with the driving unit, the input voltage detection unit and the output voltage detection unit, wherein the control unit calculates an on-time period of the at least one first switch in an operation cycle according to the first detecting signal, the second detecting signal and a dimming signal, and the control unit generates the control signal to the driving unit according to the on-time period;
   wherein the control unit comprises:
   a dimming signal processor configured for receiving the dimming signal and generating a reference current according to the dimming signal;
   a storage unit electrically connected with the dimming signal processor for storing the reference current;
   a computing unit electrically connected with the storage unit, the input voltage detection unit and the output voltage detection unit, wherein the computing unit calculates the on-time period of the at least one first switch according to the reference current, the first detecting signal and the second detecting signal, and then outputs a calculating result; and
   a pulse controller electrically connected with the computing unit, wherein the computing unit receives the calculating result and generates the control signal according to the calculating result.

2. The dimming driver circuit according to claim 1, wherein the power converting unit is a buck converter, a boost converter or a buck-boost converter.

3. The dimming driver circuit according to claim 1, wherein the input voltage detection unit comprises:
   a first resistor, wherein a first end of the first resistor is electrically connected with a positive input terminal of the input terminals; and
   a second resistor, wherein a first end of the second resistor is electrically connected with a second end of the first resistor, and a second end of the second resistor is electrically connected with a ground terminal.

4. The dimming driver circuit according to claim 1, wherein the output voltage detection unit comprises:

a third resistor, wherein a first end of the third resistor is electrically connected with a positive output terminal of the output terminals;

a fourth resistor, wherein a first end of the fourth resistor is electrically connected with a ground terminal; and a second switch comprising a control terminal, a third terminal and a fourth terminal, wherein the third terminal is electrically connected with a second end of the third resistor, the fourth terminal is electrically connected with a second end of the fourth resistor, and the control terminal is electrically connected with a negative output terminal of the output terminals of the power converting unit.

5. The dimming driver circuit according to claim 1, wherein the output voltage detection unit comprises:

a third resistor, wherein a first end of the third resistor is electrically connected with a positive output terminal of the output terminals; and a fourth resistor, wherein a first end of the fourth resistor is electrically connected with a ground terminal, and a second end of the fourth resistor is electrically connected with the control unit and a second end of the third resistor.

6. The dimming driver circuit according to claim 1, wherein if the reference current is lower than a current threshold, the computing unit calculates the on-time period according to the current threshold, the first detecting signal and the second detecting signal, and calculates a chopped pulse number of a pulse chopping modulation according to the reference current.

7. The dimming driver circuit according to claim 6, wherein the pulse controller receives the on-time period and the chopped pulse number of the pulse chopping modulation and generates the control signal according to the on-time period and the chopped pulse number.

8. The dimming driver circuit according to claim 7, wherein the chopped pulse number of the pulse chopping modulation is calculated according to a formula: $K=(1-Idim/Imid) \times fs/fz$, wherein K is a chopped pulse number, Idim is the reference current, Imid is the current threshold, fs is a pulse frequency of the control signal, and fz is a chopped pulse frequency.

9. A control method for a dimming driver circuit, the dimming driver circuit being configured for adjusting brightness of a light emitting diode, the dimming driver circuit comprising a power converting unit and a control unit, the power converting unit comprising at least one first switch, the power converting unit converting an input voltage into an output voltage, the control method comprising steps of:

(a) generating a first detecting signal according to the input voltage, and generating a second detecting signal according to the output voltage;

(b) receiving and processing a dimming signal to generate a reference current;

(c) storing the reference current into a storage unit;

(d) calculating an on-time period of the switch in an operation cycle according to the first detecting signal, the second detecting signal and the reference current, and outputting a calculating result; and (e) generating a control signal according to the calculating result, and controlling an operation of the switch.

10. The control method according to claim 9, wherein the step (c) further comprises steps of:

(1) judging whether a new dimming signal is received;

(2) if a judging result of the step (1) indicates that the new dimming signal is received, updating the reference current and storing the updated reference current into the storage unit; and (3) reading the reference current from the storage unit, and performing the step (d).

11. The control method according to claim 10, wherein if the judging result of the step (1) indicates that no new dimming signal is received, the step (3) is performed.

12. The control method according to claim 9, wherein the step (d) comprises steps of:

(1) judging whether the reference current is lower than a current threshold; and (2) if a judging result of the step (1) indicates that the reference current is lower than the current threshold, calculating the on-time period according to the first detecting signal, the second detecting signal and the current threshold and calculating a chopped pulse number of a pulse chopping modulation according to the reference current; and performing the step (e) according to the calculating result of the on-time period and the chopped pulse number.

13. The control method according to claim 12, wherein in the step (2), the chopped pulse number of the pulse chopping modulation is calculated according to a formula: $K=(1-Idim/Imid) \times fs/fz$, wherein K is the chopped pulse number, Idim is the reference current, Imid is the current threshold, fs is a pulse frequency of the control signal, and fz is a chopped pulse frequency.

14. The control method according to claim 12, wherein if the judging result of the step (1) indicates that the reference current is not lower than the current threshold, calculating the on-time period of the switch according to the reference current, the first detecting signal and the second detecting signal, and then performing the step (e) according to the calculating result of the on-time period.

* * * * *